United States Patent [19]
Weder

[11] Patent Number: 5,634,558
[45] Date of Patent: *Jun. 3, 1997

[54] FLOWER POT ASSEMBLY FORMED FROM A SHEET WITH AN OPENING

[75] Inventor: Donald E. Weder, Highland, Ill.

[73] Assignee: Southpac Trust International, Inc., Oklahoma City, Okla.

[*] Notice: The term of this patent shall not extend beyond the expiration date of Pat. No. 5,205,108.

[21] Appl. No.: 467,488

[22] Filed: Jun. 6, 1995

Related U.S. Application Data

[63] Continuation of Ser. No. 347,611, Nov. 30, 1994, Pat. No. 5,526,932, which is a continuation-in-part of Ser. No. 165,215, Dec. 10, 1993, Pat. No. 5,373,943, which is a continuation of Ser. No. 40,330, Mar. 30, 1993, Pat. No. 5,311,991, which is a division of Ser. No. 906,089, Jun. 29, 1992, Pat. No. 5,205,108, said Ser. No. 347,611, is a continuation-in-part of Ser. No. 305,246, Sep. 13, 1994, Pat. No. 5,473,856, which is a continuation of Ser. No. 991,737, Dec. 17, 1992, Pat. No. 5,345,745, which is a continuation of Ser. No. 876,947, May 1, 1992, Pat. No. 5,396,992, which is a continuation of Ser. No. 708,521, May 31, 1991, Pat. No. 5,161,348, which is a division of Ser. No. 360,367, Jun. 2, 1989, Pat. No. 5,038,933, said Ser. No. 347,611, is a continuation-in-part of Ser. No. 926,098, Aug. 5, 1992.

[51] Int. Cl.⁶ .................................................. B65D 85/52
[52] U.S. Cl. .................. 206/423; 53/397; 53/449; 47/72; 47/84; 206/460; 206/813
[58] Field of Search ........................ 53/397, 399, 449; 47/72, 84; 206/423, 460, 813

[56] References Cited

U.S. PATENT DOCUMENTS

| | | |
|---|---|---|
| D. 133,038 | 4/1942 | Lion . |
| 716,668 | 12/1902 | Cheney . |
| 1,206,708 | 11/1916 | Hutchins . |
| 1,446,563 | 2/1923 | Hughes . |
| 1,520,647 | 12/1924 | Hennegan . |
| 1,610,652 | 12/1926 | Bouchard . |
| 1,697,751 | 1/1929 | Blake . |
| 1,734,212 | 2/1929 | Snyder . |
| 1,868,853 | 7/1932 | Sievers . |
| 1,951,642 | 3/1934 | Augustin et al. ................. 47/34 |

(List continued on next page.)

FOREIGN PATENT DOCUMENTS

| | | |
|---|---|---|
| 0428234 | 5/1991 | European Pat. Off. . |
| 1084888 | 1/1955 | France . |
| 2477107 | 9/1981 | France . |
| 2489126 | 3/1982 | France . |
| 2619698 | 3/1989 | France . |
| 2651663 | 3/1991 | France . |
| 153402 | 7/1903 | Germany . |
| 345464 | 2/1917 | Germany . |
| 513971 | 11/1930 | Germany . |
| 1166692 | 3/1964 | Germany . |
| 2948265 | 5/1981 | Germany . |
| 8905250 | 10/1989 | Germany . |
| 1115 | 4/1887 | Sweden . |
| 274167 | 7/1949 | Switzerland . |
| 560532 | 4/1975 | Switzerland . |
| 15550 | of 1899 | United Kingdom . |
| 28130 | of 1907 | United Kingdom . |
| 28322 | of 1908 | United Kingdom . |
| 735800 | 8/1955 | United Kingdom . |
| 1204647 | 9/1970 | United Kingdom . |

*Primary Examiner*—Jimmy G. Foster
*Attorney, Agent, or Firm*—Dunlap & Codding, P.C.

[57] ABSTRACT

A decorative plant assembly and a method for making such including a flower pot or other pot or plant container, a sheet of material having an opening formed through a portion of the sheet of material and a bonding means for holding the sheet of material in a position about the outer peripheral surface of the pot. When placed about the pot, at least a portion of the sheet of material engages a portion of the outer peripheral surface of the pot. At least a portion of the bottom of the pot means is exposed through the opening in the sheet of material. A portion of the sheet of material may extend away from the upper end of the pot means to form a skirt. The sheet of material when extended about the outer peripheral surface of the pot may further comprise a plurality of folds. The sheet of material may further comprise a tubular extension extending from the lower surface of the sheet of material.

22 Claims, 11 Drawing Sheets

U.S. PATENT DOCUMENTS

| | | | |
|---|---|---|---|
| 1,988,886 | 1/1935 | Wilson | 47/37 |
| 2,152,648 | 4/1939 | Jones | 47/34 |
| 2,209,778 | 7/1940 | Krasowski | 41/10 |
| 2,302,259 | 11/1942 | Rothfuss | 41/10 |
| 2,540,707 | 2/1951 | Beukelman | 229/21 |
| 2,845,735 | 8/1958 | Werner | 41/10 |
| 3,022,605 | 2/1962 | Reynolds | 47/58 |
| 3,271,922 | 9/1966 | Wallerstein et al. | 53/3 |
| 3,316,675 | 5/1967 | Cartwright, Jr. | 47/37 |
| 3,376,666 | 4/1968 | Leonard | 47/11 |
| 3,488,022 | 1/1970 | Vitorri | 248/152 |
| 3,556,389 | 1/1971 | Gregoire . | |
| 4,223,480 | 9/1980 | Welty | 47/73 |
| 4,280,314 | 7/1981 | Stuck | 53/241 |
| 4,333,267 | 6/1982 | Witte | 47/84 |
| 4,384,604 | 5/1983 | DeLaura et al. | 150/52 |
| 4,413,725 | 11/1983 | Bruno et al. | 206/45.33 |
| 4,799,520 | 1/1989 | Blackburn et al. | 150/52 |
| 4,801,014 | 1/1989 | Meadows | 206/423 |
| 5,085,003 | 2/1992 | Garcia | 47/72 |
| 5,161,348 | 11/1992 | Weder | 53/399 |
| 5,205,108 | 4/1993 | Weder et al. | 53/399 |
| 5,235,782 | 8/1993 | Landau | 47/72 |
| 5,239,775 | 8/1993 | Landau | 47/72 |
| 5,311,991 | 5/1994 | Weder et al. | 206/423 |
| 5,373,943 | 12/1994 | Weder et al. | 206/423 |

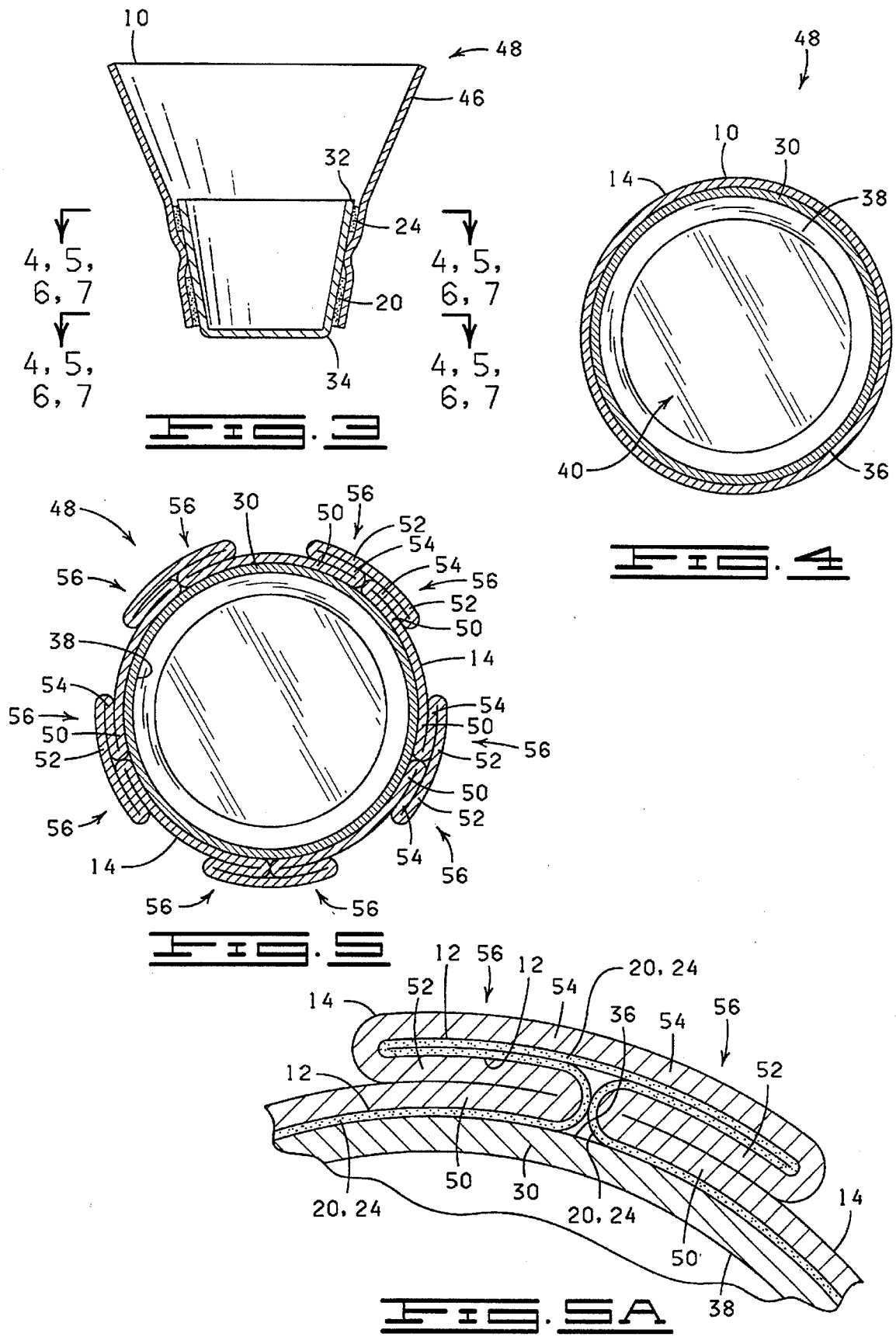

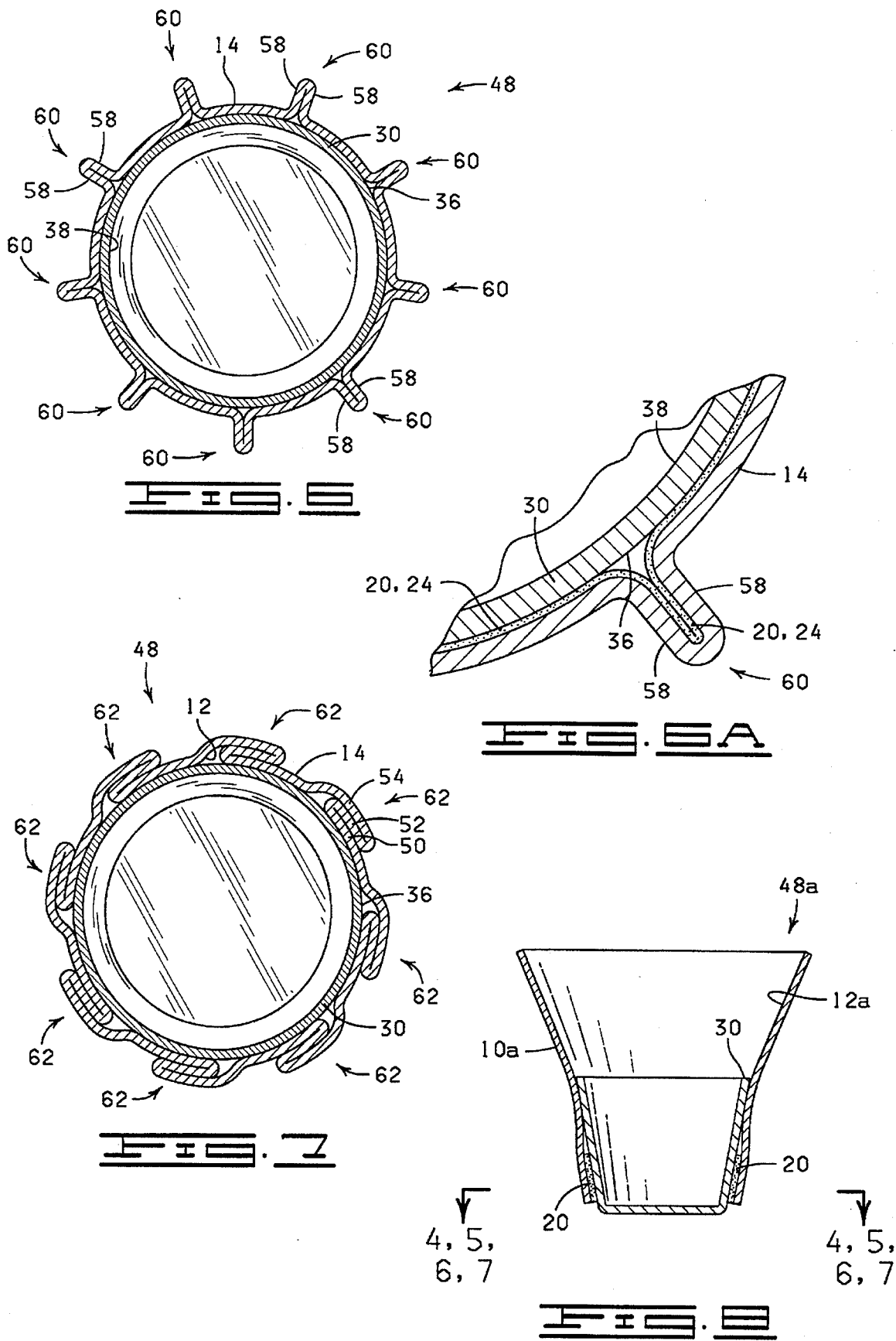

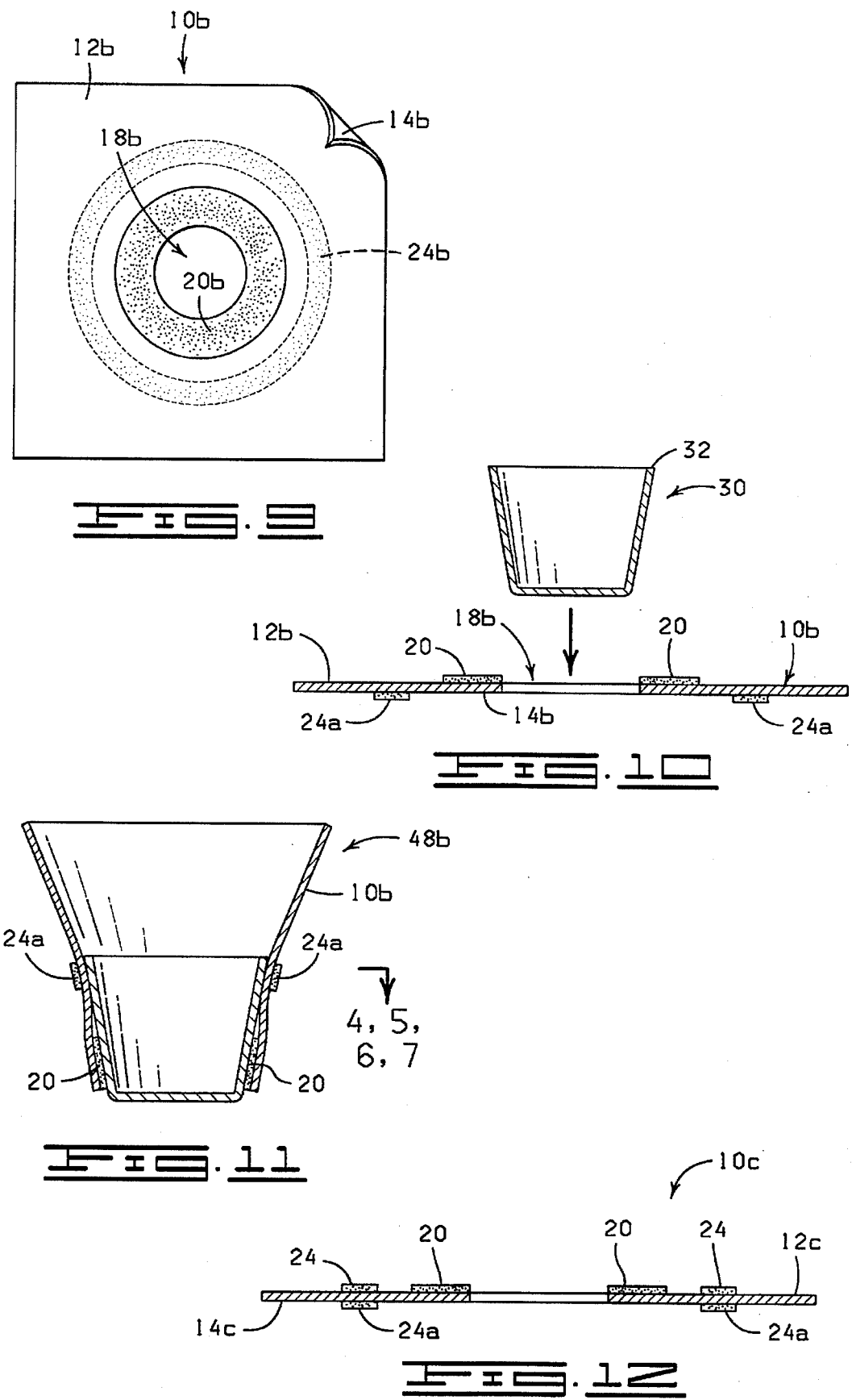

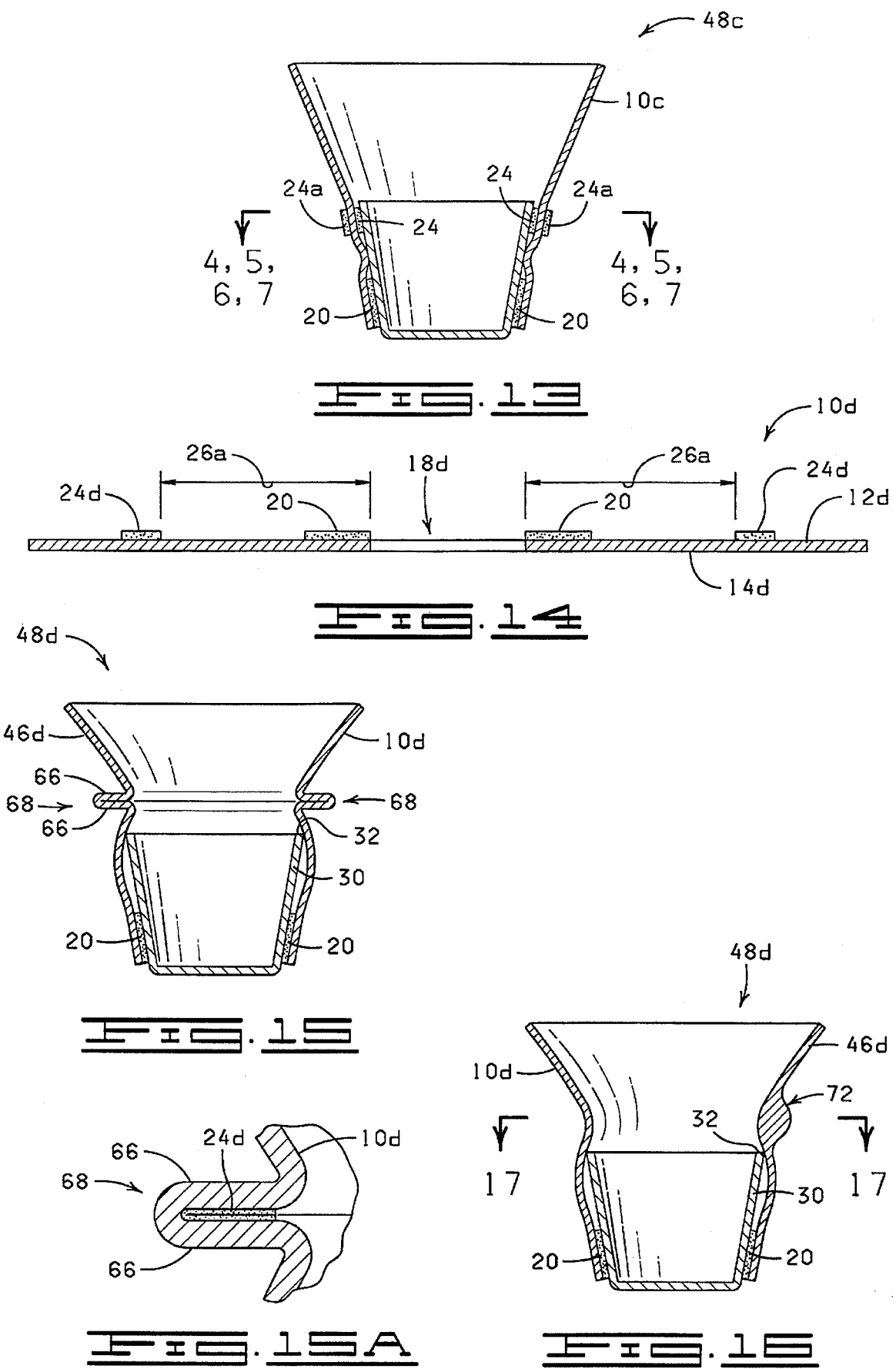

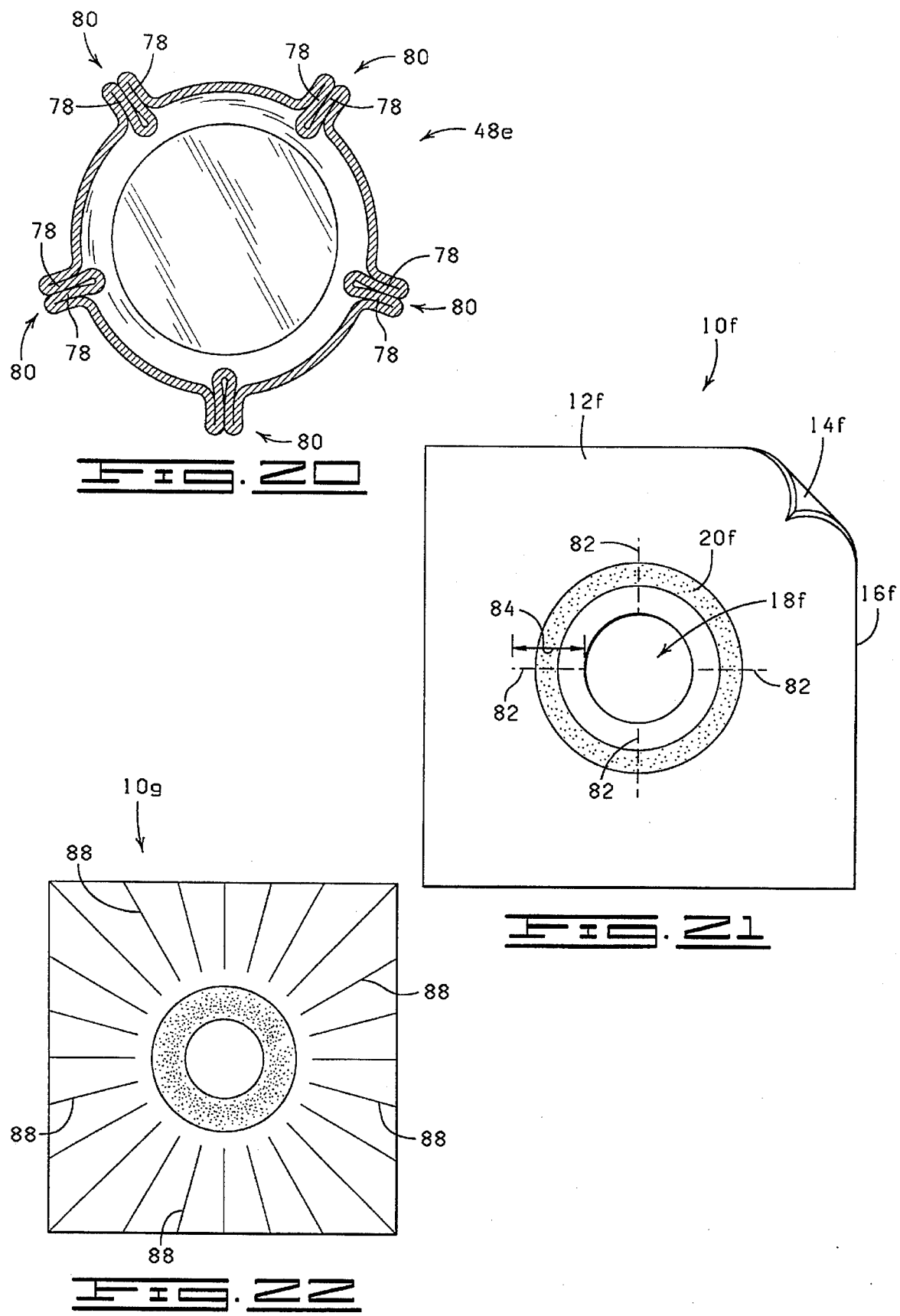

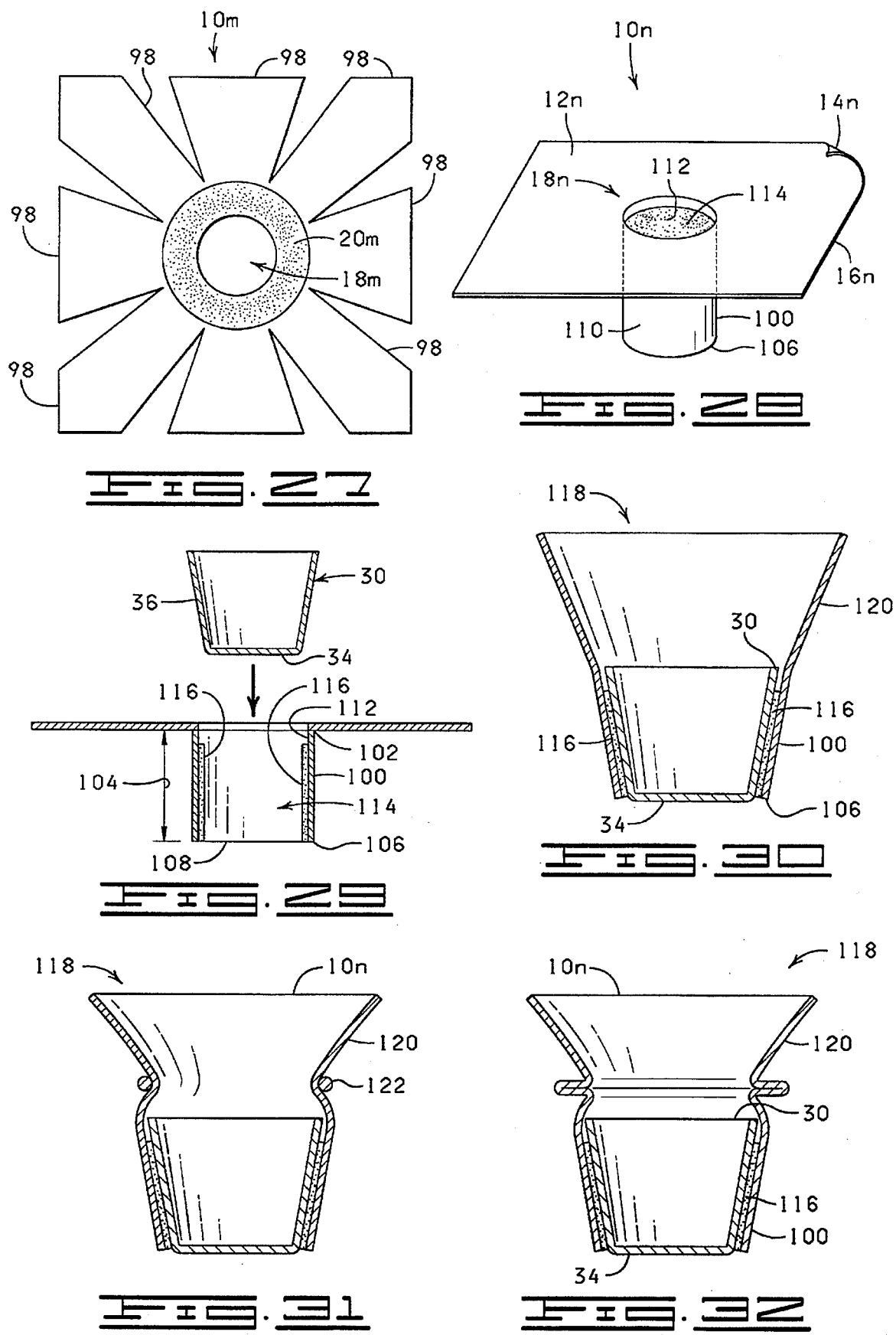

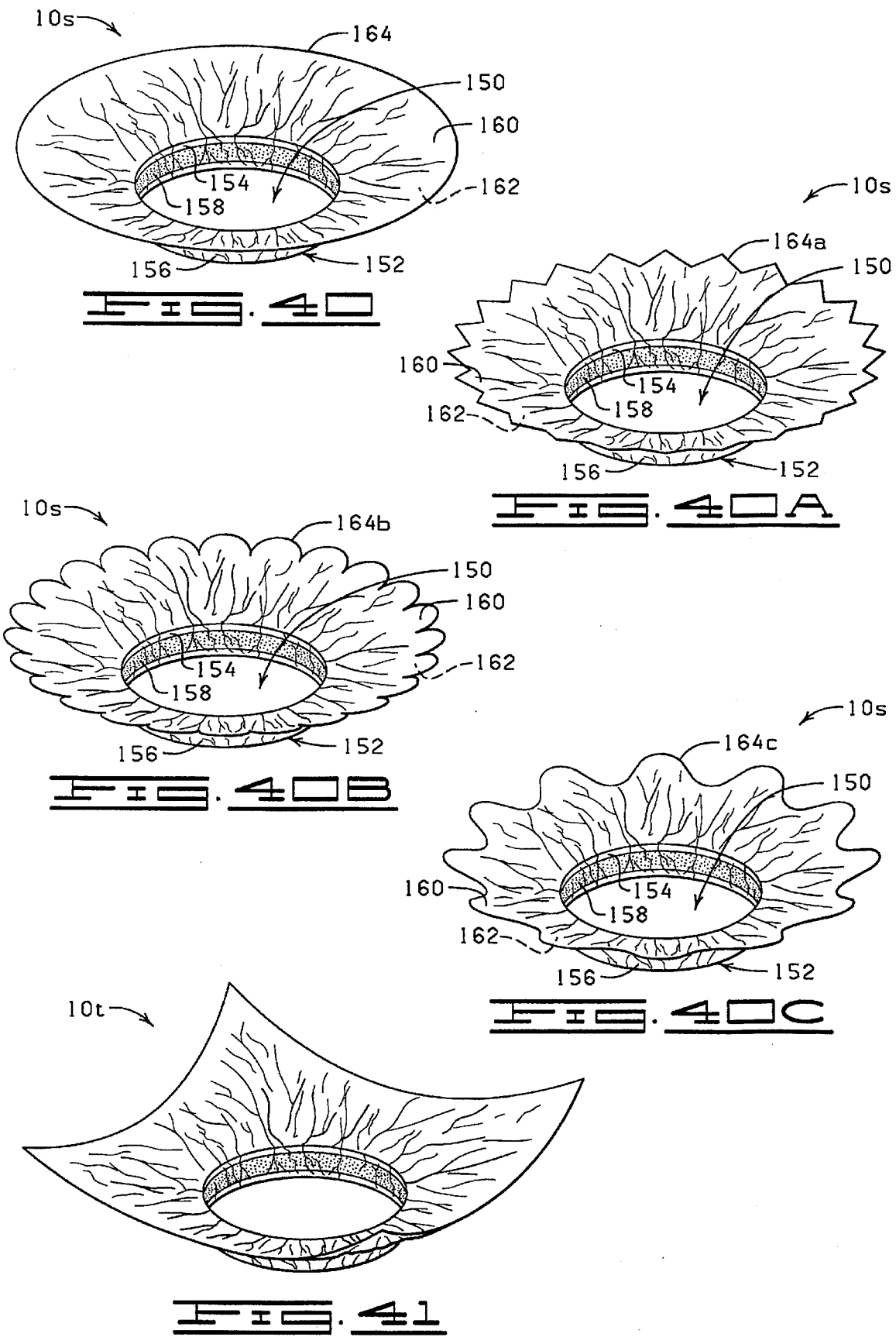

FLOWER POT ASSEMBLY FORMED FROM A SHEET WITH AN OPENING

CROSS REFERENCE TO RELATED APPLICATIONS

This is a continuation of application Ser. No. 08/347,611 filed on Nov. 30, 1994, now U.S. Pat. No. 5,526,932, which is a continuation-in-part of U.S. Ser. No. 08/165,215, filed Dec. 10, 1993, entitled "Packaging For Wrapping A Floral Grouping With A Wrap Having A Wrap Opening (as amended)", now U.S. Pat. No. 5,373,943, which is a continuation of Ser. No. 08/040,330 filed Mar. 30, 1993, entitled "A Packaging For Wrapping A Floral Grouping With A Wrap Having a Wrap Opening (as amended), now U.S. Pat. No. 5,311,991, which is a division of U.S. Ser. No. 07/906,089, filed Jun. 29, 1992, entitled "Method of Wrapping A Floral Grouping With A Wrapper Having A Central Opening", now U.S. Pat. No. 5,205,108.

Said application U.S. Ser. No. 08/347,611 is also a continuation-in-part of U.S. Ser. No. 08/305,246, filed Sep. 13, 1994, entitled "Wrapping Material For Providing A Decorative Covering, now U.S. Pat. No. 5,473,856, which is a continuation of U.S. Ser. No. 07/991,737 filed Dec. 17, 1992, entitled "Wrapping Material For Providing A Decorative Covering, now U.S. Pat. No. 5,345,745, which is a continuation of U.S. Ser. No. 07/876,947, filed May 1, 1992, entitled "Wrapping Material For Providing A Decorative Covering", now U.S. Pat. No. 5,396,992, which is a continuation of U.S. Ser. No. 07/708,521, filed May 31, 1991, entitled "Wrapping Material For Providing A Decorative Covering", now U.S. Pat. No. 5,161,348, which is a division of U.S. Ser. No. 07/360,367, filed Jun. 2, 1989, entitled "Wrapping Material For Providing A Decorative Covering", now U.S. Pat. No. 5,038,933.

Said application U.S. Ser. No. 08/347,611 is also a continuation-in-part of U.S. Ser. No. 07/926,098, filed Aug. 5, 1992, entitled "Method and Apparatus For Forming A Decorative Cover", pending.

The specification of each of the above-referenced U.S. patents and patent applications is hereby incorporated herein by reference.

FIELD OF THE INVENTION

The present invention is related to the field of decorative container coverings, and more particularly to decorative coverings bondingly connected to containers such as flower pots.

BRIEF DESCRIPTION OF THE DRAWINGS

FIG. 3 is aside view of the sheet of FIG. 1 applied about a pot.

FIG. 4 is a top sectional view showing one version of how the sheet of FIG. 1 is applied to the pot.

FIG. 5 is a top sectional view of another version of how the sheet of FIG. 1 is applied to the pot.

FIG. 5A is a view of an enlargement of a fold shown in FIG. 5.

FIG. 6 is a top sectional view of another version of how the sheet of FIG. 1 is applied to the pot.

FIG. 6A is a view of an enlargement of a fold shown in FIG. 6.

FIG. 7 is a top section view of another version of how the sheet of FIG. 1 is applied to the pot.

FIG. 8 is a side sectional view of another sheet of material applied to a pot.

FIG. 9 is a top plan view of another sheet of material constructed in accordance with the present invention.

FIG. 10 is a side view of the sheet of FIG. 9 with a pot disposed thereover.

FIG. 11 is a side view of the sheet of FIG. 9 applied about a pot.

FIG. 12 is a side view of yet another sheet of material constructed in accordance with the present invention.

FIG. 13 is a side view of the sheet of FIG. 12 applied about a pot.

FIG. 14 is a side view of yet another sheet of material constructed in accordance with the present invention.

FIG. 15 is a side view of the sheet of material of FIG. 14 applied about a pot.

FIG. 15A is a view of an enlargement of the fold shown in FIG. 15.

FIG. 16 is a side view of the sheet of material of FIG. 14 applied in another manner to a pot.

FIG. 20 is a top sectional view of the sheet of material of FIG. 18 applied in another manner to a pot.

FIG. 21 is a top plan view of yet another sheet of material constructed in accordance with the present invention.

FIG. 22 is a top plan view of yet another sheet of material constructed in accordance with the present invention.

FIG. 27 is a top plan view of yet another sheet of material constructed in accordance with the present invention.

FIG. 28 is a perspective view of yet another sheet of material constructed in accordance with the present invention.

FIG. 29 is a side view of the sheet of FIG. 28 with a pot disposed thereover.

FIG. 30 is a side view of the sheet of FIG. 28 applied about the pot.

FIG. 31 is a side view of the sheet of FIG. 28 applied about the pot also with a bonding means applied about the sheet.

FIG. 32 is a side view of a sheet such as the sheet of FIG. 28 with a crimped portion formed in the sheet above the upper end of the pot.

FIG. 40 is a perspective view of a preformed skirt constructed in accordance with the present invention.

FIG. 40A shows an alternative design for the edge of the skirt shown in FIG. 40.

FIG. 40B shows another alternative design for the edge of the skirt shown in FIG. 40.

FIG. 40C shows yet another design for the edge of the skirt shown in FIG. 40.

FIG. 41 shows another version of a preformed skirt.

BRIEF DESCRIPTION OF THE INVENTION

Figure 1:
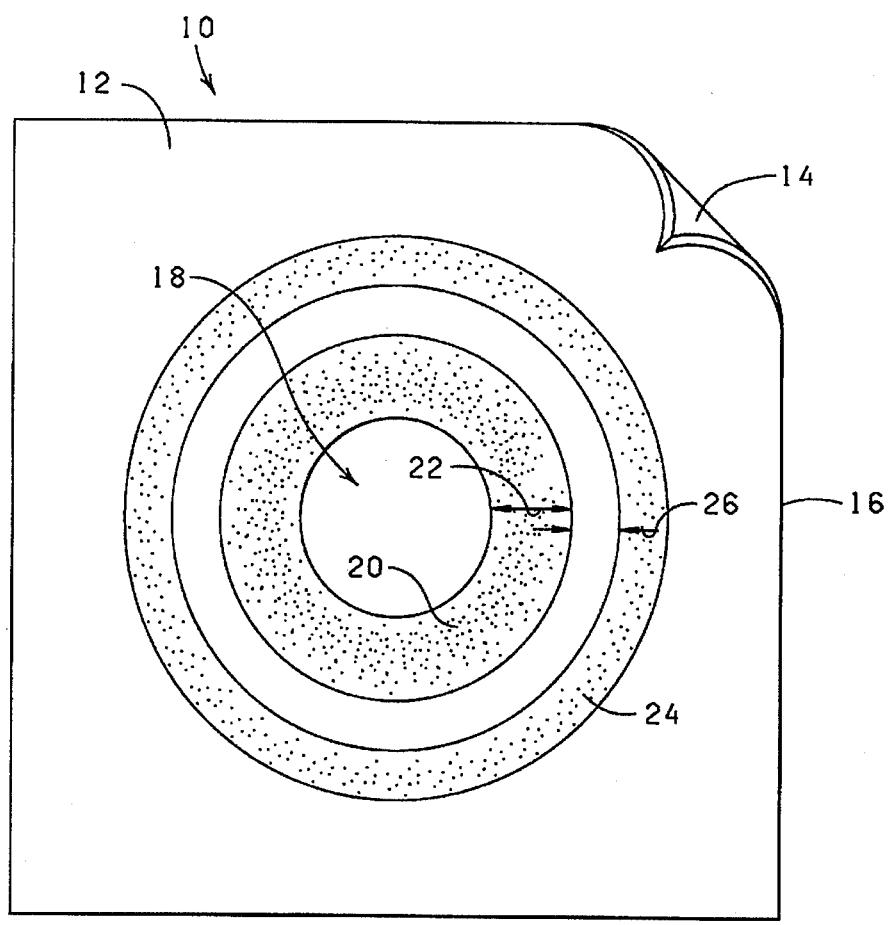
FIG. 1 is a plan view of a sheet of material constructed in accordance with the present invention.

The present invention is a decorative plant assembly which comprises a flower pot or other pot or plant container having a base, an upper end, a bottom, and an outer peripheral surface. The assembly further comprises a sheet of material having an upper surface, a lower surface, an outer peripheral edge and an opening formed through a portion of the sheet of material and spaced a distance from the outer peripheral edge. The assembly also has a bonding means or material for holding the sheet of material in a position about the outer peripheral surface of the pot means. The assembly is constructed by the pot having been disposed within the opening so that at least a portion of the sheet of material engages a portion of the outer peripheral surface of the pot and the sheet of material extends about and surrounds at least a portion of the outer peripheral surface of the pot. Also, at least a portion of the bottom of the pot is exposed through the opening in the sheet of material. Further, the bonding material serves to hold the sheet of material in a position about the pot. A portion of the sheet of material may extend away from the upper end of the pot to form a skirt. The pot may have a botanical item contained therein.

The bonding means may comprise a bonding material disposed upon a portion of at least one of the upper and lower surfaces of the sheet of material. Or the bonding means may be an elastic band, a tie, or a ribbon. In another version of the invention the bonding means may be a flexible sleeve for applying over a portion of the sheet of material surrounding the pot once the sheet of material has been disposed about the pot.

Or the bonding means may be a secondary pot, or overpot, for applying over a portion of the sheet of material surrounding the first pot once the sheet of material has been disposed about the pot. In this case the sheet of material may further comprise a bonding material disposed upon a portion thereof for bondingly connecting a portion of the sheet of material to at least a portion of the outer peripheral surface of the pot.

The bonding means may further comprise a bonding material disposed upon a portion of the outer peripheral surface of the pot for bondingly connecting a portion of the sheet of material to the outer peripheral surface of the pot.

The sheet of material when extended about the outer peripheral surface of the pot may further comprise a plurality of folds. The folds may have a Z-shape, U-shape, or M-shape in cross-section, or a combination of these. At least some of the folds may have portions which are bondingly connected by a bonding material. The connected folds may be disposed in a position below the upper end of the pot. Or the connected folds may be disposed in a position above the upper end of the pot.

The bonding material may connectingly engage the sheet of material to the outer peripheral surface of the pot at a position near the bottom of the pot such that the sheet of material covers a substantial portion of the base of the pot. The bonding material may connectingly engage the sheet of material to the outer peripheral surface of the pot at a position near the upper end or near the lower end, or near both the upper and lower ends, or near the middle of the pot. Thus the bonding material may connect the sheet of material to the outer peripheral surface of the pot at more than one distinct position. A portion of the sheet of material may be bondingly connected to a portion of the bottom of the pot.

The sheet of material may have one or more lines of perforations which extend from the opening a distance toward the outer peripheral edge of the sheet of material. Or the sheet of material may further comprise a plurality of score lines which extend radially from the opening a distance toward the outer peripheral edge of the sheet of material. Or the sheet of material may further comprise one or more cuts which extend radially from the opening a distance toward the outer peripheral edge of the sheet of material. The sheet of material may further comprise a plurality of segments which extend radially outwardly from the opening.

The sheet of material may further comprise a tubular extension extending from the lower surface of the sheet of material, the tubular extension having a proximal end, a distal end, an outer peripheral surface, an inner peripheral surface, a proximal opening contiguous with the sheet opening, a distal opening at the distal end and an inner space defined by the inner peripheral surface. The tubular extension is generally adapted to contain and engage at least a portion of the outer peripheral surface of a pot. The sheet may have a bonding material disposed on at least a portion of the inner peripheral surface of the tubular extension for bondingly connecting a portion of the tubular extension to a portion of the outer peripheral surface of the pot disposed within the tubular extension. A portion of the sheet of material may extend away from the upper end of the pot means to form a skirt.

Another version of the invention comprises a skirt formed into a non-flat shape and having an opening therein. An extension or rim extends downwardly from the opening. On the inner surface of the rim is a bonding material for bondingly connecting to the outer surface of a pot. The skirt may be formed by molding a sheet of material into a form having folds, portions of which may be connected. The skirt may have a concave shape or a convex shape such that the skirt, when connected to a pot may extend upwardly, outwardly, or downwardly from the upper end of the pot.

The present invention in another version contemplates a method of assembling a decorative plant package, by (1) providing a pot, or container having a base, an upper end, a bottom, and an outer peripheral surface, (2) providing a sheet of material as described above having an upper surface, a lower surface, an outer peripheral edge and an opening formed through a portion of the sheet of material and spaced a distance from the outer peripheral edge, the sheet of material further comprising bonding means for holding the sheet of material in a position about the outer peripheral surface of the pot, (3) disposing the pot over the opening in the sheet of material, and (4) placing a portion of the sheet of material about the outer peripheral surface of the pot wherein at least a portion of the sheet of material engages a portion of the outer peripheral surface of the pot such that the sheet of material extends about and surrounds at least a portion of the outer peripheral surface of the pot and wherein at least a portion of the bottom of the pot is exposed through the opening in the sheet of material, the bonding means holding the sheet of material in a position about the pot.

In the step of providing a sheet of material the bonding means may further comprise a flexible sleeve and the additional step of applying the flexible sleeve over a portion of the sheet of material surrounding the pot once the sheet of material has been placed about the pot. Also the bonding means may further comprise a secondary pot means and the additional step of applying the secondary pot over a portion of the sheet of material surrounding the first pot once the sheet of material has been placed about the pot.

In the step of placing a portion of the sheet of material about the outer peripheral surface of the pot the sheet of material when extended about the outer peripheral surface of the pot may further comprise a plurality of folds. At least some of the folds may have a Z-shape, M-shape, or U-shape in cross-section. At least some of the folds may have portions which are connected.

In the method the sheet of material may further comprise a tubular extension extending from the lower surface of the sheet of material, the tubular extension having a proximal end, a distal end, an outer peripheral surface, an inner peripheral surface, a proximal opening contiguous with the sheet opening, a distal opening at the distal end and an inner space defined by the inner peripheral surface and wherein the tubular extension is adapted to contain and engage at least a portion of the outer peripheral surface of the pot, the tubular extension having a bonding material disposed on at least a portion of the inner peripheral surface thereof. The method may further comprise the step of placing a portion of the pot within the tubular extension and bondingly connecting a portion of the inner peripheral surface of the tubular extension to a portion of the outer peripheral surface of a pot. A portion of the sheet of material may extend away from the upper end of the pot to form a skirt.

In the step of placing the sheet at least a portion of the sheet of material may be bondingly connected by a bonding material to a portion of the bottom of the pot.

The decorative assembly and the method of making the decorative assembly will now be described in more detail below.

Embodiments of FIGS. 1–13

Shown in FIG. 1 and represented by the general reference numeral 10 is a sheet of material for wrapping about a potted plant. The sheet of material has an upper surface 12, a lower surface 14, an outer peripheral edge 16, and an opening 18 formed through a portion of the sheet of material 10. Preferably, the opening 18 is formed through a central portion of the sheet of material 10 extending from the upper surface 12 to the lower surface 14. The opening 18 may also be "off-center". In a preferred embodiment, an area of bonding material 20 is disposed upon a portion of the upper surface 12 in a position generally surrounding the opening 18 and extending a distance 22 away from the opening 18 in a direction toward the outer peripheral edge 16 of the sheet of material 10. The bonding material 20 is shown as disposed in a circle about the opening 18 but it will be understood that the bonding material may be disposed in a variety of arrangements, including, but not limited to, spots, checkerboard, dapples, or stripes.

The bonding material 20 is preferably a pressure sensitive adhesive or cohesive but may comprise other compositions as explained in further detail below. The sheet of material 10 in a preferred embodiment further comprises a second area of bonding material 24 disposed on a portion of the upper surface 12 spaced a distance 26 from the first area of bonding material 20. This second area of bonding material 24 may be disposed upon the upper surface 12 in a variety of arrangements other than as the ring shown in FIG. 1. In some embodiments, the first and second areas of bonding material 20 and 24 may form a single contiguous and continuous area of bonding material as discussed in more detail below. It will be appreciated that a sheet of material used in accordance with the present invention may comprise one or more areas of bonding material.

The material from which the sheet of material 10 is constructed generally has a thickness in a range from about 0.1 mils to about 30 mils. Often, the thickness of the sheet 10 is in a range from about 0.5 mils to about 10 mils. Preferably, the sheet 10 has a thickness in a range from about 1.0 mil to about 5 mils. The sheet 10 may be constructed from a material which is flexible, semi-rigid, rigid, or any combination thereof. Preferably, the material is flexible. The sheet 10 may be constructed of a single layer of material or a plurality of layers of the same or different types of materials. Any thickness of the material may be utilized as long as the material functions in accordance with the present invention as described herein. The layers of material comprising the sheet 10 may be connected together or laminated or may be separate layers. Such materials used to construct the sheet 10 are described in U.S. Pat. No. 5,111,637 entitled "Method For Wrapping A Floral Grouping" issued to Weder et al., on May 12, 1992, which is hereby incorporated herein by reference.

Any thickness of material may be utilized in accordance with the present invention as long as the sheet 10 may be formed into a plant cover as described herein, and as long as the formed plant cover may be bondingly connected to at least a portion of a pot or potted plant, as described in further detail below. Additionally, an insulating material such as bubble film, preferable as one of two or more layers, can be utilized in order to provide additional protection for the item, such as the pot covered thereby. When used herein the term pot cover or decorative cover may include covers known as skirts which are attached to the pot near the upper end thereof and which extend from the upper end of the pot.

In one embodiment, the sheet of material 10 may be constructed from two polypropylene films. The material comprising the sheet 10 may be connected together or laminated or may be separate layers. In an alternative embodiment, the sheet 10 may be constructed from only one of the polypropylene films.

The sheet 10 may also be constructed, in whole or in part, from a cling material. "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a pot or container. This connecting engagement is preferably temporary in that the material may be easily removed, i.e., the cling material "clings" to the pot.

The cling material is constructed and treated if necessary, from polyethylene such as Cling Wrap made by Glad®, First Brands Corporation, Danbury, Conn. The thickness of the cling material will, in part, depend upon the size of sheet 10 and the size of the pot attached to the sheet 10, i.e., generally, a larger pot may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The sheet 10 is constructed from any suitable material that is capable of being formed into a plant cover and wrapped about a pot disposed therein. Preferably, the material comprises paper (untreated or treated in any manner), cellophane, metal foil, polymer film, non-polymer film, fabric (woven or nonwoven or synthetic or natural), cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material comprising the sheet 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil and/Or Synthetic Organic Polymer" issued to Kingman on Sep. 15, 1992 and which is hereby incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. Each of the above-named characteristics may occur alone or in combination and may be applied to the upper and/or lower surface of the material comprising the sheet 10. Moreover, portions of the material used in constructing the sheet 10 may vary in the combination of such characteristics. The material utilized for the sheet 10 itself may be opaque, translucent, transparent, or partially clear or tinted transparent.

The term "pot" as used herein refers to any type of container used for holding a floral grouping or plant. Examples of pots, used in accordance with the present invention include, but not by way of limitation, clay pots, wooden pots, plastic pots, pots made from natural and/or synthetic fibers, or any combination thereof. The pot is adapted to receive a floral grouping or botanical item in the retaining space. The floral grouping may be disposed within the pot along with a suitable growing medium described in further detail below, or other retaining medium, such as a floral foam.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping may comprise a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

It will be understood that the bonding material may be disposed as strips, blocks or circles, among other arrangements, on a surface of the sheet 10. The bonding material may also be disposed upon the outer surface of the pot or on a portion of the inner surface of the pot. Further, the bonding material may be disposed as spots of bonding material, or in any other geometric, non-geometric, asymmetric, or fanciful form, and in any pattern including covering either the entire inner peripheral surface and/or outer peripheral surface of the sheet 10 and/or the pot or pot cover. The bonding material may be covered by a cover or release strip which can be removed prior to the use of the plant cover, pot or pot cover. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material or bonding means" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material or bonding means" also includes materials which are heat sealable and, in this instance, the adjacent portions of the material must be brought into contact and then heat must be applied to effect the seal. The term " bonding material or bonding means" also includes materials which are sonic sealable and vibratory sealable. The term "bonding material or bonding means" when used herein also means a heat sealing lacquer or hot melt material which may be applied to the material and, in this instance, heat, sound waves, or vibrations, also must be applied to effect the sealing.

The term "bonding material or bonding, means" when used herein also means any type of material or thing which can be used to effect the bonding or connecting of the two adjacent portions of the material or sheet of material to effect the connection or bonding described herein. The sheet 10 embodied herein may further comprise other "bonding materials or bonding means" which may also include ties, labels, bands, ribbons, strings, tapes (including single or double-sided adhesive tapes), staples or combinations thereof. Some of the bonding materials would secure the ends of the material while other bonding material may bind the circumference of a sheet, or a plant cover, or, alternatively and/or in addition, the bonding materials would secure overlapping folds in the material and/or plant cover. Another way to secure the wrapping and/or plant cover is to heat seal the ends of the material to another portion of the material. One way to do this is to contact the ends with an iron of sufficient heat to heat seal the material.

Alternatively, a cold seal adhesive may be utilized as the bonding material or means. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material or bonding means" when used herein also means any heat or chemically shrinkable material, and static electrical or other electrical means, chemical welding means, magnetic means, mechanical or barb-type fastening means or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

Figure 2:
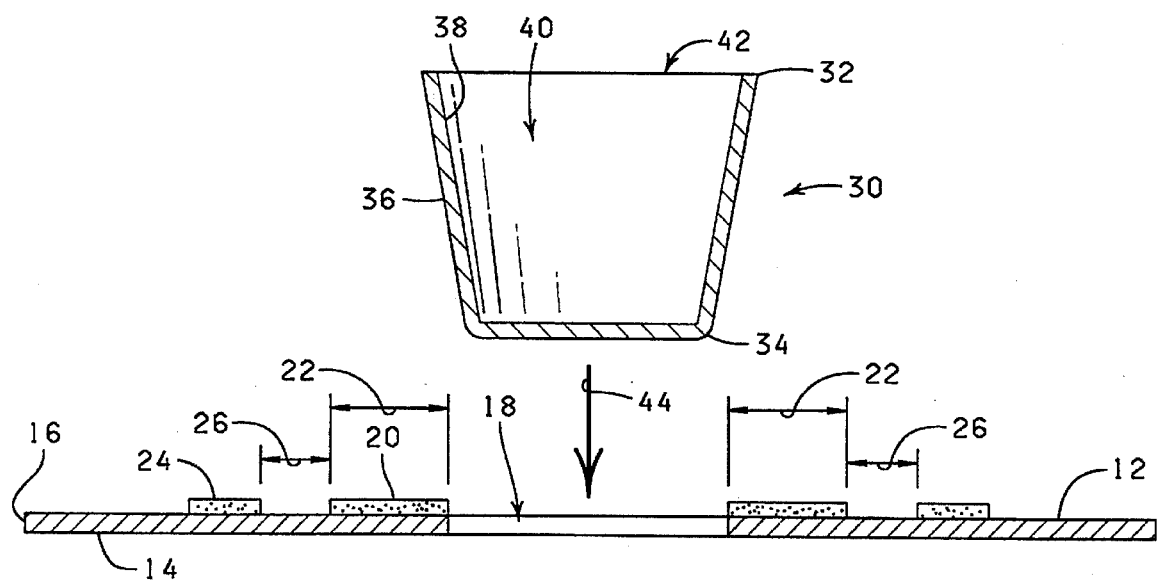
FIG. 2 is a side view of the sheet of FIG. 1 with a pot disposed thereover.

In operation, the sheet of material 10 is used to form a decorative cover about a pot, represented in FIG. 2 by the general reference numeral 30. The pot 30 may be empty or may have a plant, floral grouping, botanical item or propagule disposed therein, or may have a growing medium disposed therein (not shown). The pot 30 has an upper end 32, a lower end 34, an outer peripheral surface 36, an inner peripheral surface 38, an inner retaining space 40 and an opening 42 extending from the upper end 32 into the inner retaining space 40. In a preferred method of forming the sheet of material 10 into a skirt or decorative cover about the pot 30, the pot 30 is disposed in a position above the opening 18 in the sheet of material 10 and is thrust in a direction 44 into the opening 18 in the sheet of material 10. A portion of the upper surface 12 of the sheet of material 10 engages the outer peripheral surface 36 of the pot 30 generally from the lower end 34 of the pot 30 to the upper end 32 of the pot 30. The first area of bonding material 20 on the upper surface 12 of the sheet of material 10 bondingly engages and connects the adjacent portion of the outer peripheral surface 36 of the pot 30. The sheet of material 10 may engage the outer peripheral surface 36 of the pot 30 during the mere action of pulling or pushing the pot 30 through the opening 18, or the sheet of material 10 may be manually or automatically pressed against the outer peripheral surface 36 to cause the first area of bonding material 20 to engage the outer peripheral surface 36 of the pot 30, or the sheet 10 may be pulled up around the pot 30.

As the pot 30 is being disposed through the opening 18 in the sheet of material 10, the portion of the sheet of material 10 having the second area of bonding material 24 disposed thereon is brought adjacent the outer peripheral surface 36 of the pot 30. This portion of the sheet of material 10 is caused to bondingly engage and connect to the outer peripheral surface 36 of the pot 30 either manually or automatically whereby a portion of the sheet of material 10 is caused to extend outwardly from the upper end 32 of the pot 30 to form a skirt portion 46 in the cover formed thereby. The skirt 46 may extend vertically, horizontally or angularly from the upper end 32 of the pot 30 or inwardly from the upper end 32 of the pot 30.

FIG. 3 shows a sheet of material 10 formed into a decorative cover 48 about a pot 30 in accordance with the invention as described herein. The second area of bonding material 24, and optionally the first area of bonding material 20, is crimpingly formed against the outer peripheral surface 36 of the pot 30 thereby forming a plurality of folds in the sheet of material 10. The folds may be overlapping folds.

FIG. 4 shows the sheet of material 10 bondingly connected to the outer peripheral surface 36 of the pot 30 in one embodiment forming a cover 48. FIGS. 5, 5A, 6, 6A and 7 show three other possible embodiments of configurations of folds in the portion of the sheet of material 10 crimpingly formed about the pot 30 by either or both of the first or second areas of bonding material 20 or 24.

FIG. 4 shows a cross-sectional view through the portion of the sheet of material 10 bondingly engaged to the lower portion of the outer peripheral surface 36 of the pot 30. In this embodiment, a portion of the upper surface 12 of the sheet of material 10 is bondingly engaged by the bonding material 20 and/or 24 to the outer peripheral surface 36 of the pot 30 substantially or completely without folds being formed in that portion of the sheet of material 10.

FIG. 5 shows a cover 48 having a plurality of folds in which some portions 50 of the upper surface 12 of the sheet of material 10 are bondingly engaged to portions of the outer peripheral surface 36 of the pot 30 and by the bonding material (not shown) other portions 52 of the upper surface 12 of the sheet of material 10 are bondingly engaged to overlapping portions 54 of the upper surface 12 of the sheet of material 10 by the bonding material (not shown) thereby forming a plurality of z-shaped overlapping folds 56 connected by the bonding material 20 or 24 (not shown in FIG. 5).

FIG. 5A shows an enlargement of a z-shaped overlapping fold 56 in cover 48 which shows the position of the bonding material 20 or 24 in relation to the overlapping portions of the sheet 10. As shown, the surface 12 of portion 50 is bonded to the outer surface 36 of the pot 30. The surface 14 of portion 50 faces the surface 14 of portion 52. Portion 50 is not bonded to portion 52 since there is no bonding material disposed on surface 14 of the sheet 10 in this embodiment. The surface 12 of the portion 52 faces and is bonded to the surface 12 of portion 54 of the sheet 10 via the bonding material 20 or 24 which is disposed on the surface 12 of sheet 10. A similar pattern is repeated for the corresponding z-shaped fold 56 and for each other z-shaped fold 56 in the decorative cover 48.

FIG. 6 shows another embodiment of the cover 48 comprising a plurality of folds in which some portions of the upper surface 12 of the sheet of material 10 are bondingly engaged to the outer peripheral surface 36 of the pot 30 and other portions 58 of the upper surface 12 of the sheet 10 are pinched together forming a U-shaped fold 60, extending outwardly from the pot 30 and wherein the surfaces 12 of the portions 58 of the folds 60 in cover 48 which face each other are bondingly engaged to each other by the bonding material 20 or 24.

FIG. 6A shows an enlargement of a U-shaped fold 60 in cover 48 which shows the position of the bonding material 20 or 24 in relation to the overlapping surfaces of the sheet 10. As shown, the facing surfaces 12 of each of the portions 58 are bondingly engaged to one another by the bonding material 20 or 24, as the case may be. A similar pattern is repeated for each U-shaped fold 60 in the decorative cover 48.

FIG. 7 shows yet another manner in which the sheet of material 10 may be bonded to the pot 30 in the form of cover 48. In this version there are a plurality of folds 62 which are similar to the z-shaped folds 56 shown in FIG. 5 except that the folds 56 shown in FIG. 5 are positioned as pairs of "mirror image" folds 56 while in FIG. 7 each z-shaped fold 62 occurs, singly and not as one of a distinct pair of adjacent folds 56.

Each fold 62 has a portion 50 bonded to a portion of the surface 36 of the pot 30. The surface 14 of the portion 50 faces the surface 14 of a portion 52. Portion 52 has a surface 12 having a bonding material 20 or 24 disposed thereon and is bonded thereby to the surface 12 of the portion 54 of the sheet 10.

It will be understood by one of ordinary skill in the art that when the sheet of material is bondingly engaged to the outer peripheral surface of the pot that a combination of the types of folds shown in FIGS. 5–7 may be formed in the sheet of material, for example, the pinch folds 60 of FIG. 6 may alternate with the z-shaped folds 56 or 62 of either or both of FIGS. 5 and 7. Also, the sheet 10 may be attached to the pot 30 in other ways which form folds having configurations not shown herein.

As noted above, FIGS. 1–7 show a sheet of material having a first area 20 and a second area 24 of bonding material. Preferably the bonding material in either or both cases is a pressure sensitive adhesive. Alternatively, the bonding material may be a cohesive material which bondingly engages with a similarly cohesive surface when contacted thereto or the bonding material may be other material as discussed herein. When either the first area of bonding material 20 or the second area of bonding material 24 is a cohesive, the cohesive is understood to bondingly engage with another adjacent cohesive surface, either on the outer peripheral surface 36 of the pot 30 or on the upper surface 12 of the sheet of material 10. Any of the folds 56, 60 or 62 shown as formed in FIGS. 5–7 may be bonded together by a cohesive material. For example, in FIGS. 5–7, where portions of the sheet of material 10 are bondingly engaged to the pot 30, a cohesive material is disposed not only on the upper surface 12 of the sheet of material 10, but also on adjacent portions of the outer peripheral surface 36 of the pot 30.

In an alternative embodiment shown in FIG. 8, a sheet of material generally referred to by the reference numeral 10a is exactly the same as sheet 10 shown in FIG. 1 except it has only a single area of bonding material 20 for bonding the sheet of material 10a to the pot 30. There is not a second area of bonding material on the upper surface 12a of the sheet of material 10a for connecting the sheet of material 10a to a portion of the pot 30 near the upper end 32 of the pot 30. The sheet of material 10a may still be bondingly engaged to the outer surface 36 of the pot 30 in the manner described for FIGS. 4, 5, 6 and 7 (forming folds in the latter three) forming a decorative cover 48a, except that a portion of the sheet of material 10a is not bondingly engaged to the outer surface 36 of the pot 30 at another position.

It will be appreciated that the bonding material 20 of the sheet 10a may be bondingly engaged with the outer surface 36 of the pot 30 near the upper end 32 of the pot 30, rather than near the lower end 34 of the pot 30. In the configuration the sheet of material 10a essentially forms a skirt about the upper end 32 of the pot 30.

Shown in FIGS. 9 and 10, is a sheet of material designated by the general reference numeral 10b which is exactly the same as sheet 10 in FIG. 1 except that the sheet 10b has a second area of bonding material 24a which is located on the lower surface 14b of the sheet of material 10b rather than on the upper surface 12b. The sheet of material 10b has a first area of bonding material 20 for connecting a base portion of the sheet of material 10b to the pot 30 in exactly the same way the sheet 10 is connected to the pot 30 shown in FIG. 3. Shown in FIG. 11, when the sheet of material 10b is bondingly engaged with the pot 30, the second area of bonding material 24a is oriented outwardly from near the upper end 32 of the pot 30 to form a decorative cover 48b. The portion of the sheet of material 10b near the upper end 32 of the pot 30 and having the bonding material 24a can be formed into folds such as folds 56, and 62 described in FIGS. 5 and 7 and described in detail above except that folds are connected by the bonding material 24a (for example, pressure sensitive adhesive or cohesive) disposed on the lower (outwardly oriented) surface 14b of the sheet of material 10b. For example, the folds are the same as folds 56 in FIG. 5A except the bonding material 24b bonds the facing surface 14 of portions 50 and 52 instead of bonding portions 50 to the pot surface 36 and portions 52 to portions 54.

Shown in FIGS. 12 and 13 is another embodiment, a sheet of material designated by the general reference numeral 10c which is exactly the same as sheet 10 shown in FIGS. 1–3 in having a first area of bonding material 20 and a second area of bonding material 24 on the upper surface 12c of the sheet of material 10c but differing in that it also has a third area of bonding material 24a on the lower surface 14c of the sheet 10c. The sheet of material 10c can then be disposed about a pot 30 in the manner shown for sheet 10 in FIG. 3 except that the third area of bonding material 24a is exposed outwardly from the sheet of material 10c as shown in FIG. 13 (and similar to that shown in FIG. 11). Portions of the sheet of material 10c near the upper end 32 of the pot 30 can be bondingly engaged to the outer surface 36 of the upper end 32 of the pot 30 in the same manner as shown in FIGS. 4–7 wherein both the second area of bonding material 24 and third area of bonding material 24a each serve together or separately to bondingly connect portions of the sheet of material 10c together to form a decorative cover 48c. Bonding material 20 also serves to bondingly connect portions of the sheet 10c as described above for sheet 10.

Embodiments of FIGS. 14–20

Shown in FIG. 14 and represented by the general reference numeral 10d is a sheet of material having an upper surface 12d and a lower surface 14d which is exactly the same as the sheet 10 shown in FIGS. 1–3 except that a second area of bonding material designated by the numeral 24d is located a length 26a from the outer edge of the opening 18d. When the sheet of material 10d is disposed about the outer surface 36 of the pot 30 forming a decorative cover 48d as shown in FIGS. 15 and 16, the length 26a is a length such that the second area of bonding material 24d is positioned above the upper end 32 of the pot 30. The second area of bonding material 24d can be used to crimp portions of the sheet of material 10d into a plurality of connecting U-shaped folds for holding the sheet of material 10d about the upper end 32 of the pot 30 and for urging portions of the sheet 10d to extend outwardly from the upper end 32 of the pot 30 to form a skirt 46d extending therefrom. Shown in FIGS. 15 and 15A, a crimped area is formed by pinching overlapping portions 66 of the sheet of material 10d into an annular plurality of folds 68 which extend laterally, outwardly and circumferentially above the upper end 32 of the pot 30. The second area of bonding material 24d effects a connection between adjacent inner surfaces of the overlapping portions 66 of the sheet 10d as indicated in FIG. 15A. The folds 68 which comprise the crimped area can be formed manually or automatically by a device designed to perform such a function. Such devices are within the skill of one of ordinary skill in the art and may comprise mechanical fingers which pinch portions of the sheet together to form the folds.

Figure 17:
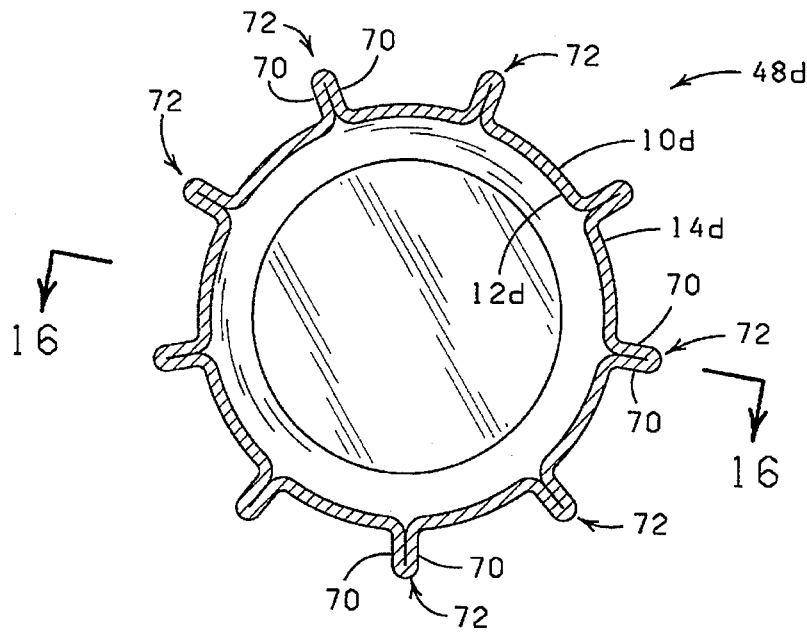
FIG. 17 is a top sectional view through the pot and sheet assembly of FIG. 16.

Alternatively, the crimped area of the decorative cover 48d may be formed as shown in FIGS. 16 and 17. FIG. 17 is a cross-section of a plurality of U-shaped folds formed in the sheet 10d above the upper end 32 of the pot 30, wherein the folds 68 are vertically pinched portions 70 of the sheet 10d which form folds 72 positioned at regular or irregular intervals about the circumference of the formed cover 48d.

Figure 18:
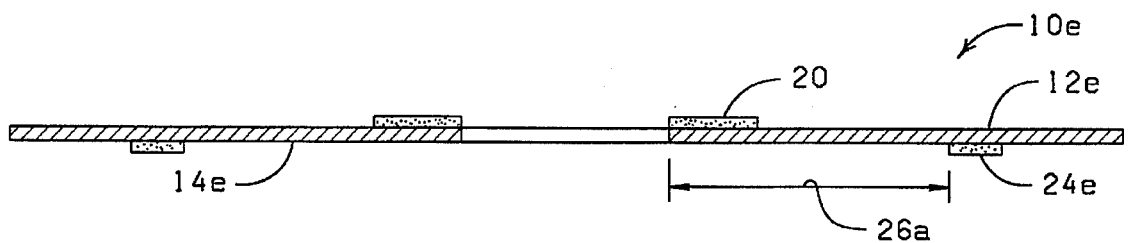
FIG. 18 is a side view of yet another sheet of material constructed in accordance with the present invention.

FIG. 18 shows a sheet of material designated by the general reference numeral 10e having an upper surface 12e and a lower surface 14e and which is exactly the same as the sheet of material 10d shown in FIG. 14 except that the area of bonding material for crimping the skirt portion is disposed on the lower surface 14e of the sheet of material 10e as a second area of bonding material 24e. The sheet of material 10e can be formed about a pot 30 in the same manner as sheet 10d to form a skirt portion above the pot 30.

Figure 19:
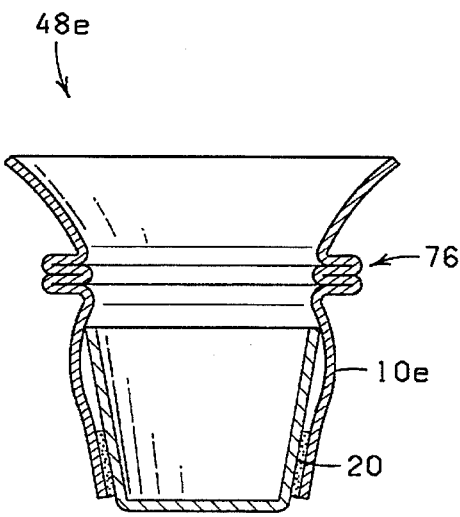
FIG. 19 is a side view of the sheet of material of FIG. 18 applied about a pot.
Figure 19A:
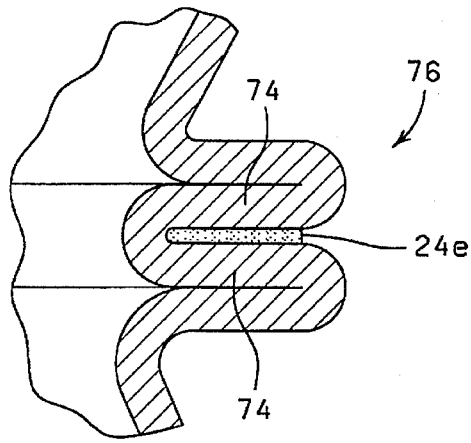
FIG. 19A is a view of an enlargement of a fold shown in FIG. 19.

As shown in FIG. 19, the sheet of material 10e can be formed about the pot 30 exactly the same way as sheet 10d is formed about a pot 30 in FIG. 15 except that folds 76 are formed by pinching portions of the sheet of material 10e into an annular plurality of M-shaped folds extending partially inwardly and partially outwardly and circumferentially about the upper end 32 of the pot 30. Overlapping portions 74 of the sheet of material 10e are connected into folds 76 (see FIG. 19A) by the second area of bonding material 24e on the lower surface 14e of the sheet of material 10e which when the sheet 10e is formed into a decorative cover 48e about the pot 30 is exposed in an outward direction from the surface 36 of the pot 30.

Alternatively, the crimped area of the decorative cover 48e may be formed as shown in FIG. 20. FIG. 20 is a cross-section of the cover 48e showing a plurality of vertical M-shaped folds formed in the sheet 10e by vertically pinching portions 78 of the sheet 10e wherein the bonding material 24e bondingly connects the portions 78 into folds 80. The folds 80 may be positioned at regular or irregular intervals about the circumference of the formed cover 48e. Each fold 76 and 80 is actually comprised of a pair of overlapped portions, the adjacent surfaces connected by the bonding material 24e forming, in essence, a plurality of double, M-shaped, folds.

Embodiments of FIGS. 21–27

Shown in FIG. 21 and designated by the general reference numeral 10f is a sheet of material having an upper surface 12f, a lower surface 14f and an outer edge 16f constructed exactly the same as sheet 10 in FIG. 1 except that sheet 10f has but an area of bonding material 20f which may be positioned differently on the upper surface 12f of the sheet 10f. Further, sheet 10f has at least one, and preferably a plurality of lines of perforations 82 which extend through the upper surface 12f to the lower surface 14f, and which extend from the outer edge of an opening 18f in the sheet 10f a distance 84 in a direction toward the outer peripheral edge 16f of the sheet of material 10f. The lines of perforations 82 function to enable portions of the sheet of material 10f to be cleanly and easily torn as the pot 30 is pushed through the opening 18f in the sheet 10f. It will be understood that the sheet 10f and any other sheet discussed and described hereafter herein can have any arrangement of bonding material disposed on either or both the upper surface and lower surface of such sheet of material which allows the sheet to function in accordance with the present invention as described herein. It will also be understood that any of the sheets of material described herein can be used in combination with a tying, banding or ribbon device to tie or band the sheet of material about the pot 30 or to otherwise decorate the sheet of material when applied about the pot 30.

FIG. 22 shows a sheet of material designated by the reference numeral 10g which is exactly the same as the sheet 10a described above and shown in FIG. 8 except the sheet 10g has been scored with a plurality of score lines 88 (only a few of which are labeled) to urge the sheet of material 10g to form folds in predetermined arrangements described above when the sheet 10g is formed about a pot 30 in a manner described herein.

Figure 23:
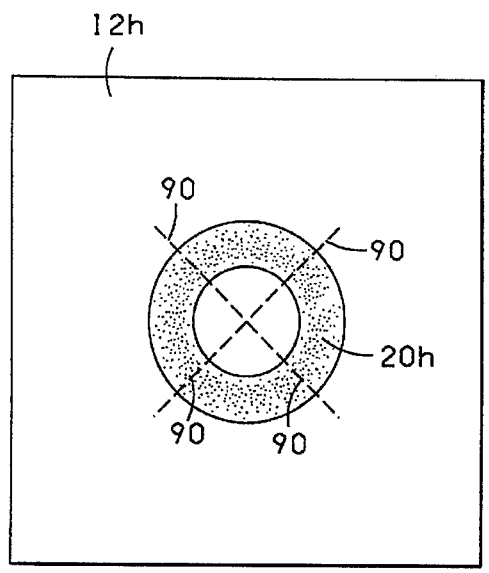
FIG. 23 is a top plan view of yet another sheet of material constructed in accordance with the present invention.

FIG. 23 shows a sheet of material designated by the general reference numeral 10h which is exactly like the sheets described elsewhere herein except the sheet 10h does not have an opening through which a pot 30 can be inserted. Instead the sheet 10h has at least one, and preferably a plurality of lines of perforations 90 disposed in the sheet 10h generally near the center of the sheet 10h for enabling the sheet 10h to be cleanly and easily torn when a pot 30 is pushed through the central portion of the sheet 10h or when the sheet 10h is pulled up about the pot 30.

Figure 24:
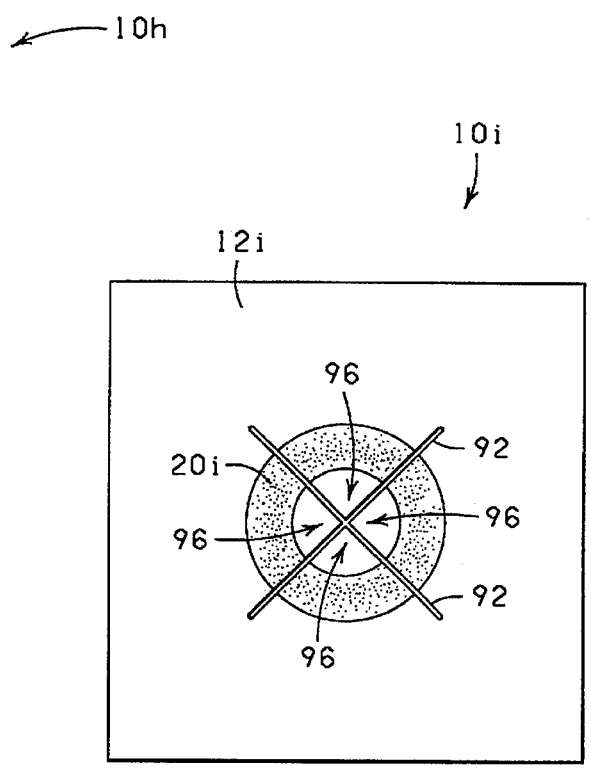
FIG. 24 is a top plan view of yet another sheet of material constructed in accordance with the present invention.
Figure 25:
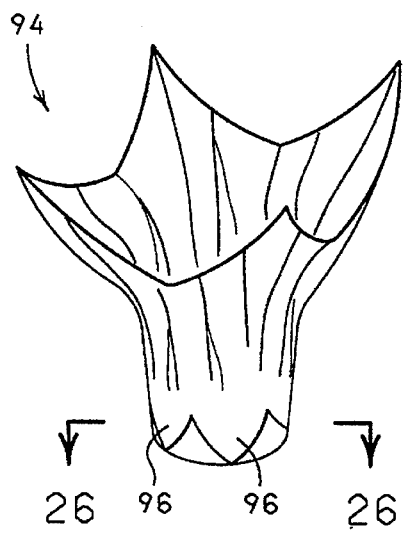
FIG. 25 is a perspective view of a sheet of material such as a sheet shown in FIGS. 21-24 applied about a pot.

FIG. 24 is a sheet of material designated by the general reference numeral 10i which is exactly the same as sheet 10h in FIG. 24 except that instead of a plurality of lines of perforations 90, the sheet 10i actually has a cut, or preferably a plurality of cuts 92 in the central portion of the sheet 10i. When a pot 30 is urged through the central portions of the sheets 10f, 10h, or 10i, the cut or perforated area opens up to form an opening through which the pot 30 can be urged forming a decorative cover 94 about the pot 30 generally as shown in FIG. 25.

Figure 26:
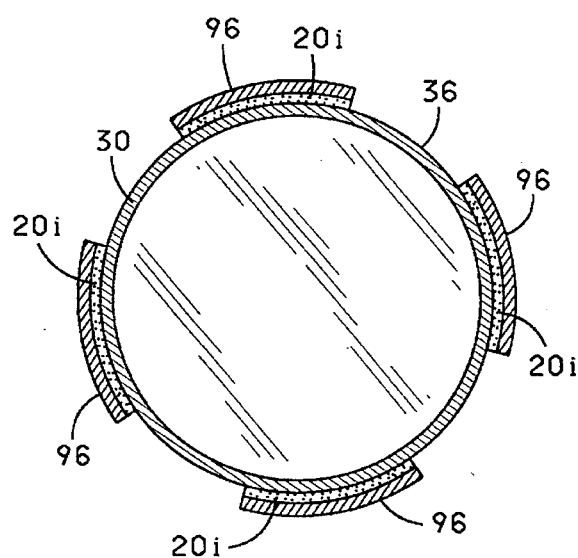
FIG. 26 is a top sectional view through the sheet and pot of FIG. 25.

A plurality of pointed central segments 96 are formed when the pot 30 is pushed through the sheet, the upper surface 12f, 12h, or 12i of each central segment 96 is bondingly connected to the outer peripheral surface 36 of the pot 30 by a bonding material 20f, 20h, or 20i, respectively on the upper surfaces of each of the central segments 96, as shown in FIG. 26. Folds having configurations the same as those shown in FIGS. 5–7 may be formed in the portions of the sheets of material 10f, 10h or 10i near the upper end 32 of the pot 30.

FIG. 27 shows a sheet of material designated by the general reference numeral 10m, and having an opening 18m, which is exactly like the sheets described elsewhere herein except the sheet 10m comprises a plurality of segments 98 which when formed about a pot 30 form a decorative cover.

Embodiments of FIGS. 28–37

Shown in FIGS. 28 and 29 is a sheet of material designated by the general reference numeral 10n. The sheet has an upper surface 12n, a lower surface 14n, an outer edge 16n and an opening 18n. The sheet 10n is constructed exactly the same as the sheets described elsewhere herein except that the sheet of material 10n also has a tubular extension 100 which is attached at its first end 102 near the inner edge of the opening 18n in the sheet 10n and extends a distance 104 away from the lower surface 14n of the sheet 10n. The tubular extension 100 has a second end 106 which has an opening 108 therethrough. The tubular extension 100 has an outer surface 110, an inner surface 112 and an inner space 114. Preferably, the tubular extension 100 has a bonding material 116 disposed upon a portion of the inner surface 112 thereof as shown in FIGS. 28–30. Alternatively, the tubular extension 100 may have no bonding material disposed thereon (not shown), or the tubular extension 100 may have a bonding material disposed upon the outer surface 110 thereof (not shown). In an alternate version of any of the aforementioned embodiments of sheet 10n with tubular extension 100, the sheet of material 10n may have a bonding material disposed on one or more areas of either or both the upper surface 12n and/or lower surface 14n of the sheet of material 10n as described previously herein.

In operation, a pot 30 is disposed over the opening 18n in the sheet of material 10n and is projected through the opening 18n into the inner space 114 of the tubular extension 100. In the preferred embodiment, the bonding material 116 on the inner surface 112 of the tubular extension 100 bondingly engages the outer surface 36 of the pot 30 thereby bondingly connecting the inner surface 112 of the tubular extension 100 to the outer surface 36 of the pot 30 as shown in FIG. 30 and forming a decorative cover or skirt 118 thereabout.

In one embodiment, the tubular extension 100 covers substantially all of the outer surface 36 of the pot 30 except for the lower end 34 of the pot 30 as shown in FIG. 30. In another embodiment (not shown), the tubular extension 100 covers only a portion of the outer surface 36 of the pot 30 in an area near the upper end 32 of the pot 30 to form a skirt. If there is no area of bonding material on the sheet 10n for crimping a portion of the sheet 10n above or about the upper end 32 of the pot 30, a tying means 122 such as a tie, ribbon, band, string or other banding or tying means as described herein may be used to gather or crimp the sheet of material 10n about the upper end 32 of the pot 30 for causing or holding a skirt portion 120 of the sheet of material 10n in an outwardly extending position extending from the upper end 32 of the pot 30 as shown in FIG. 31. One particular method of securing such a pot cover 118 about a pot 30 is by applying a band 122 about the pot 30 to hold the covering in place such as is described in U.S. Pat. No. 5,105,599 entitled "Means For Securing A Decorative Cover About A Flower Pot" issued to Weder on Apr. 21, 1992 and which is hereby incorporated herein by reference.

When there is a bonding material disposed upon a portion of the sheet of material 10n (such as the bonding materials 24d and 24e of sheets 10d and 10e herein) for crimpingly engaging the sheet 10n about the upper end 32 of the pot 30, as shown in FIG. 32, the sheet of material 10n may be crimped in a manner similar to that shown in FIGS. 15–17 and 19–20 or any other manner of crimping which can be performed in accordance with the present invention.

Figure 33:
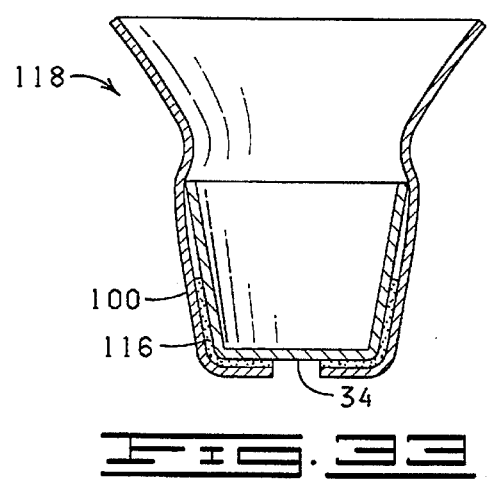
FIG. 33 is a side view of the sheet of FIG. 28 applied about the pot with a portion of the sheet applied to the bottom of the pot.
Figure 38:
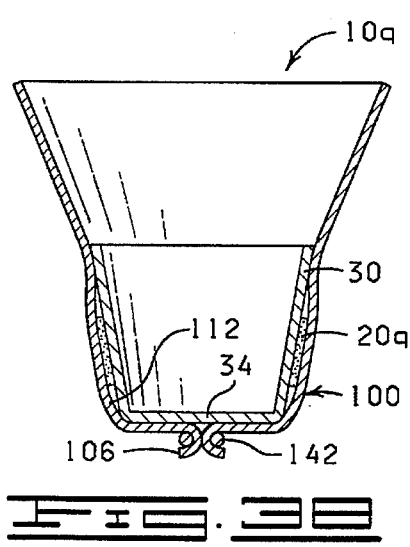
FIG. 38 is a side view of a sheet similar to the sheet of FIG. 28 and tied below the lower end of the sheet.

The tubular extension 100 of the sheet of material 10n may in some versions of the invention extend past the lower end 34 of the pot 30. FIG. 33 shows a case in which the tubular extension 100 extends onto and is bonded to a portion of the lower end 34 of the pot 30. In fact, the tubular extension 100 may extend a distance past the lower end 34 of the pot 30 such that the lower end 106 of the tubular extension 100 substantially or completely covers the lower end 34 of the pot 30 and a portion of the tubular extension 100 near the lower end 34 may even be tied with a tying means below the lower end 34 of the pot 30 (FIG. 38).

Figure 34:
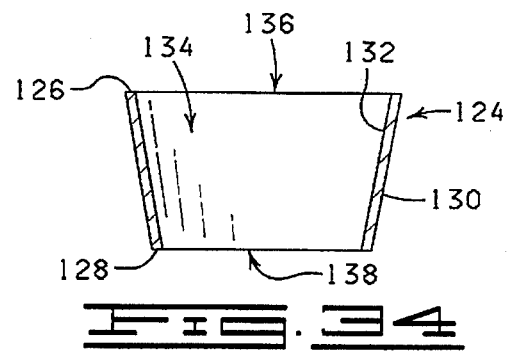
FIG. 34 is a side view of a sleeve having an open lower end.
Figure 35:
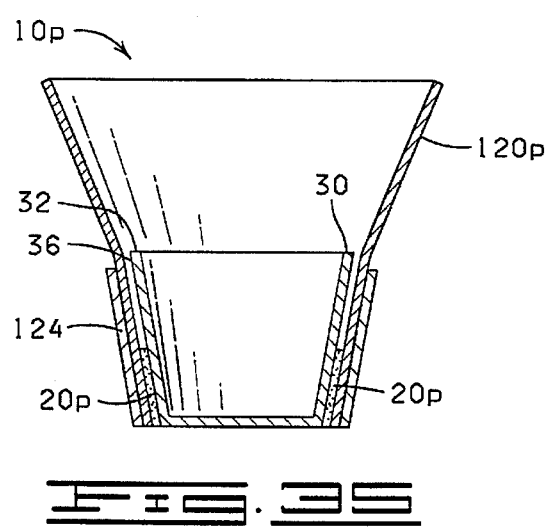
FIG. 35 is a side view of a sheet such as the sheet of FIG. 28 applied about a pot with the sleeve of FIG. 34 applied thereover.

FIG. 34 shows a sleeve 124 which is adapted to cover a pot which is covered with a sheet of material such as sheet 10a or any other sheet of material described elsewhere herein but for convenience will be referred to as sheet of material 10p. The sheet of material 10p may be bondingly connected by a bonding material 20p to the outer surface 36 of a pot 30 or it may be held thereto by means other than a bonding material such as by friction. The sleeve 124 is tubular, conical, or frusto-conical in shape or any shape adapted to fit a pot and may be pulled over or placed about a pot 30 to substantially cover, obscure or decorate all or a portion of the sheet of material 10p covering the pot 30. The sleeve 124 may further function to urge the upper portions of the sheet of material 10p to extend angularly outwardly from the upper end 32 of the pot 30 to form a skirt 120p. The sleeve 124 has an upper end 126, a lower end 128, an outer surface 130, an inner surface 132, an inner space 134, and an upper opening 136 at the upper end 126 which is open to the inner space 134 and a lower opening 138 at the lower end 128 open to the inner space 134. The sleeve 124 may be flattenable and composed of a flexible material such as a sheet or may be rigid and composed of a material such as a formed plastic or it may be semi-rigid, i.e., deformable but returnable to its original shape. Such a sleeve 124 when disposed about a pot 30 having a decorative cover disposed thereon in the manner of the present invention is shown in FIG. 35.

Figure 36:
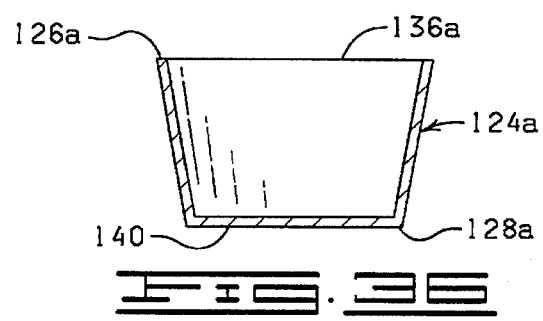
FIG. 36 is a side view of a sleeve having a closed lower end.
Figure 37:
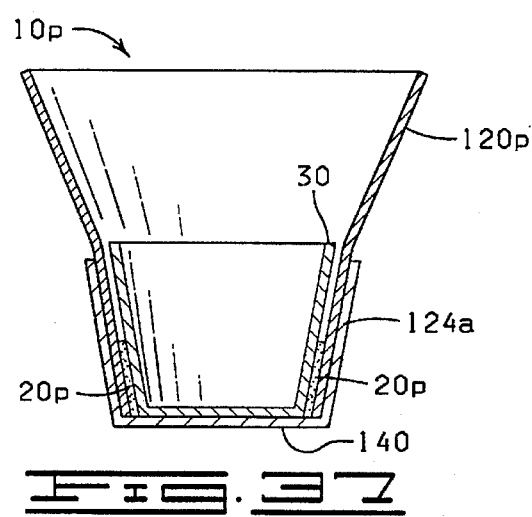
FIG. 37 is a side view of a sheet such as the sheet of FIG. 28 applied about a pot with the sleeve of FIG. 36 applied thereover.

FIG. 36 shows an alternate version of a sleeve, referred to by the numeral 124a, in which the sleeve 124a has only a single opening 136a, at the upper end 126a, and has a bottom 140 enclosing the lower end 128a. The sleeves 124 and 124a may be flexible or rigid and may, in some cases, be referred to as an "overpot". The sleeve 124a is shown disposed about the exterior of a pot 30 having a cover thereover in FIG. 37. The sheet of material 10p in FIG. 37 is shown as bondingly connected to the outer surface 36 of the pot 30 by the bonding material 20p, but it will be understood by one of ordinary skill in the art that the sheet of material 10p may be free of a bonding material as noted above and held about the pot 30 by friction or alternatively by a bonding or tying means which crimpingly holds a portion 120p of the sheet 10p above the upper end 32 of the pot 30.

In another embodiment, not shown herein but shown in U.S. Ser. No. 08/220,852 which is hereby incorporated herein by reference, any of the sheets of material shown herein may have a sheet extension which is attached to the outer peripheral edge of the sheet of material and extends outwardly therefrom which may be used as a protective sleeve to substantially or entirely cover a plant disposed within the pot covered by the sheet of material. The sheet extension may be detachable from the sheet of material via perforations or some other detaching means.

Figure 39:
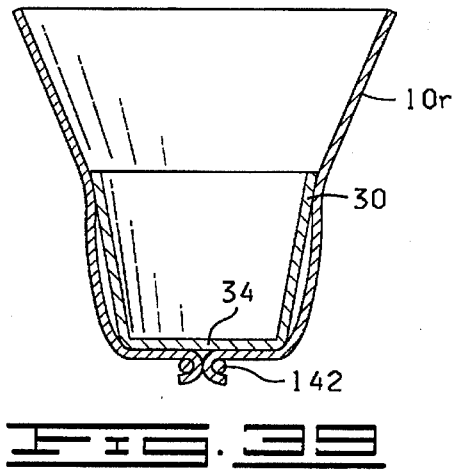
FIG. 39 is a side view of a sheet similar to the sheet of FIG. 28, but not having a bonding means thereon and tied below the lower end of the sheet.

Shown in FIG. 38 and designated by the general reference numeral 10q is a sheet of material exactly like sheet 10n except that the tubular extension 100 has a bonding means 20q disposed upon the inner surface 112 of the tubular extension 100 at an intermediate position wherein the lower end 106 of the extension 100 extends past the lower end 34 of the pot 30 and is tied thereunder by a tying means 142 such as a tie, band or string. The bonding means 20q bondingly engages a portion of the inner surface 112 of the tubular extension 100 to a portion of the outer surface 36 of the pot 30. Shown in FIG. 39 is a version of the invention in which a sheet of material 10r is disposed about a pot 30 and held thereto solely by a tying means 142.

Embodiment of FIGS. 40–41

Shown in FIG. 40 is a decorative skirt designated by the reference numeral 10s. The skirt 10s is a preformed skirt formed from a sheet of material made from a material such as disclosed elsewhere herein. The skirt 10s has an opening 150 and a rim 152 extending downwardly therefrom. The rim 152 has an inner surface 154 and an outer surface 156. Disposed upon at least a portion of the inner surface 154 is a bonding material 158 which may be an adhesive or cohesive or any other bonding material disclosed herein and which is used to bondingly connect the rim 152 to an outer portion of a pot, preferably at the upper end of the pot. The skirt 10s has an upper surface 160 and a lower surface 162. The skirt 10s may be formed from a sheet of material which has been formed by a molding apparatus described in U.S. Pat. No. 4,773,182 which is hereby incorporated herein by reference. The preformed skirt 10s may comprise a plurality of folds, some of which may contain portions which are overlapping and connected together as disclosed in U.S. Pat. No. 4,773,182. In operation, a pot is disposed into the opening 150 and the inner surface 154 appressed against the outer surface of the pot thereby causing the bonding material 158 to engage a portion of the outer surface of the pot and be bondingly connected thereto. The bonding material 158 may be covered by a release strip (not shown) which can be removed to expose the bonding material just prior to application of the skirt 10s to the pot. A plurality of skirts 10s may be stacked to increase convenience of storage of the skirts 10s.

The skirt 10s has an outer peripheral edge 164 which may be formed into a variety of shapes, several of which are shown in FIGS. 40A–C. FIG. 40A shows an edge 164a which has a zig-zag or tooth-shaped design. FIG. 40B shows an edge 164b which has a scalloped design. FIG. 40C shows an edge 164c which has a curved or wavy edge. FIG. 41 shows a skirt 10t which is formed substantially exactly the same as skirt 10s except the skirt 10t has a four-point edge design. It will be appreciated that any number of other designs may be applied to the outer peripheral edge of the skirt.

Changes may be made in the construction and the operation of the various components, elements and assemblies described herein or in the steps or the sequence of steps of the methods described herein without departing from the spirit and scope of the invention as defined in the following claims.

What is claimed is:

1. A decorative plant assembly, comprising:
    pot means having a base, an upper end, a bottom, and an outer peripheral surface, the pot means able to support a floral grouping disposed therein;
    a sheet of material having a planar surface with an upper surface, a lower surface, an outer peripheral edge and having an opening formed through a portion of the planar surface of the sheet of material and spaced a distance from the outer peripheral edge and wherein when the planar surface is in a substantially flat position, no portions of the planar surface overlap other portions of the planar surface;
    bonding means disposed on the sheet of material; and
    the pot means disposed within the opening of the sheet of material so that at least a portion of the sheet of material engages a portion of the outer peripheral surface of the pot means and wherein the sheet of material extends about and surrounds at least a portion of the outer peripheral surface of the pot means and having a plurality of folds formed in the sheet of material, at least some of the folds having portions which are connected via the bonding means, the folds cooperating to hold the sheet of material in a position about the pot means forming a decorative cover for the pot means.

2. The decorative assembly of claim 1 wherein the bonding means further comprises an adhesive material disposed upon a portion of at least one of the upper and lower surfaces of the sheet of material.

3. The decorative assembly of claim 1 further comprising bonding means for connectingly engaging the sheet of material to the outer peripheral surface of the pot means.

4. The decorative assembly of claim 1 wherein the bonding means further comprises a cohesive material disposed on a portion of at least one of the upper and lower surfaces of the sheet of material.

5. The decorative assembly of claim 1 further comprising bonding means on the sheet of material for connecting the sheet of material to the outer peripheral surface of the pot means.

6. The decorative assembly of claim 3 wherein the bonding means which connectingly engages the sheet of material to a portion of the outer peripheral surface of the pot means further comprises an adhesive or cohesive material.

7. The decorative assembly of claim 1 wherein the bonding means further comprises an adhesive material disposed upon a portion of the outer peripheral surface of the pot means for bondingly connecting a portion of the sheet of material to the outer peripheral surface of the pot means.

8. The decorative assembly of claim 1 wherein the sheet of material when extended about the pot means further comprises a skirt portion which extends beyond the folds in the sheet of material.

9. The decorative assembly of claim 1 wherein at least a portion of the sheet of material is bondingly connected by an adhesive material to a portion of the bottom of the pot means.

10. The decorative assembly of claim 1 wherein the pot means further comprises a botanical item contained therein.

11. The decorative assembly of claim 1 wherein the sheet of material further comprises a tubular extension extending from the lower surface of the sheet of material, the tubular extension having a proximal end, a distal end, an outer peripheral surface, an inner peripheral surface, a proximal opening contiguous with the sheet opening in the planar surface, a distal opening at the distal end and an inner space defined by the inner peripheral surface.

12. The decorative assembly of claim 11 wherein the tubular extension is adapted to contain and engage at least a portion of the outer peripheral surface of the pot means.

13. The decorative assembly of claim 12 further comprising a bonding material disposed on at least a portion of the inner peripheral surface of the tubular extension for bondingly connecting a portion of the tubular extension to a portion of the outer peripheral surface of a pot means disposed within the tubular extension, and wherein a portion of the sheet of material extends away from the upper end of the pot means to form a skirt.

14. A method of assembling a decorative plant package, comprising:

providing a pot means having a base, an upper end, a bottom, and an outer peripheral surface, the pot means able to support a floral grouping disposed therein;

providing a sheet of material having a planar surface with an upper surface, a lower surface, an outer peripheral edge and having an opening formed through a portion of the sheet of material and spaced a distance from the outer peripheral edge and wherein when the planar surface is in a substantially flat position, no portions of the planar surface overlap other portions of the planar surface, the sheet of material further comprising bonding means disposed thereon;

disposing the pot means over the opening in the sheet of material;

placing a portion of the sheet of material about the outer peripheral surface of the pot means wherein at least a portion of the sheet of material engages a portion of the outer peripheral surface of the pot means such that the sheet of material extends about and surrounds at least a portion of the outer peripheral surface of the pot means; and forming a plurality of folds in the sheet of material, at least some of the folds having portions which are connected via the bonding means, the folds cooperating to hold the sheet of material in a position about the pot means forming a decorative cover for the pot means.

15. The method of claim 14 wherein in the step of placing the sheet the sheet further comprises a skirt portion which extends beyond the folds in the sheet of material.

16. The method of claim 14 wherein in the step of placing the sheet at least a portion of the sheet of material is bondingly connected by an adhesive material to a portion of the bottom of the pot means.

17. The method of claim 14 wherein in the step of providing a sheet of material the bonding means further comprises an adhesive or cohesive material disposed upon a portion of at least one of the upper and lower surfaces of the sheet of material for connecting the folds.

18. The method of claim 14 further comprising the step of bondingly connectingly a portion of the sheet of material to the outer peripheral surface of the pot means via a bonding material.

19. The method of claim 18 wherein the sheet of material is bondingly connected to the outer peripheral surface of the pot means via a bonding material disposed on the sheet of material.

20. The method of claim 14 wherein in the step of providing a pot means, the pot means further comprises a bonding material disposed upon a portion of the outer peripheral surface of the pot means for bondingly connecting a portion of the sheet of material to the outer peripheral surface of the pot means.

21. The method of claim 14 wherein in the step of providing a sheet of material the sheet of material further comprises a tubular extension extending from the lower surface of the sheet of material, the tubular extension having a proximal end, a distal end, an outer peripheral surface, an inner peripheral surface, a proximal opening contiguous with the sheet opening in the planar surface, a distal opening at the distal end and an inner space defined by the inner peripheral surface and wherein the tubular extension is adapted to contain and engage at least a portion of the outer peripheral surface of the pot means; and wherein the step of placing the sheet further comprises disposing at least a portion of the pot means within the tubular extension.

22. The method of claim 21 further comprising adhesively connecting a portion of the inner peripheral surface of the tubular extension to a portion of the outer peripheral surface of a pot means, and wherein a portion of the sheet of material extends away from the upper end of the pot means to form a skirt.

* * * * *